W. WHIPPLE.
WHEEL-HARROW.
No. 187,741. Patented Feb. 27, 1877.
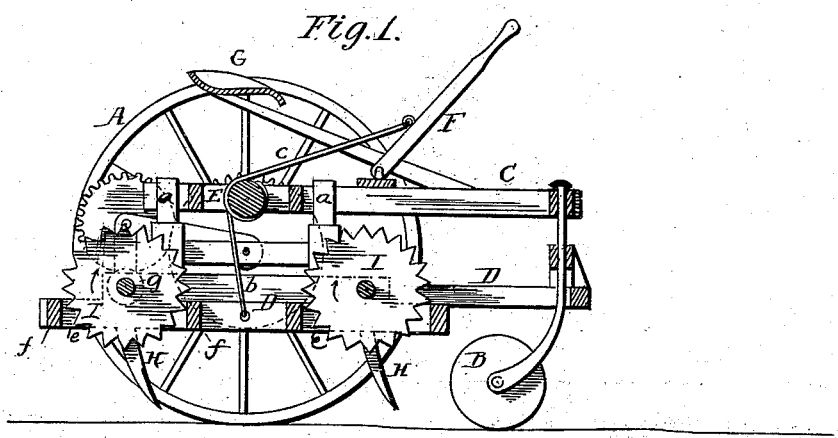
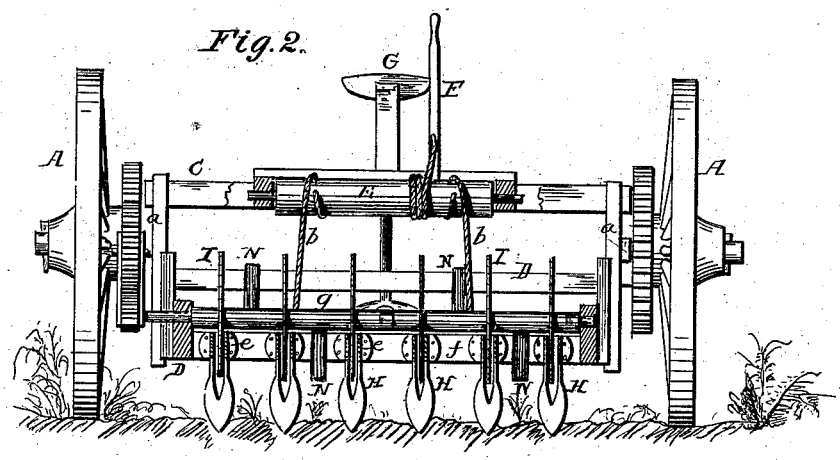
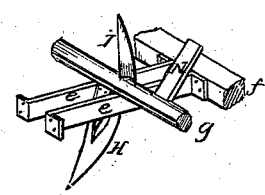

UNITED STATES PATENT OFFICE.

WILLIAM WHIPPLE, OF CARBON, IOWA.

IMPROVEMENT IN WHEEL-HARROWS.

Specification forming part of Letters Patent No. 187,741, dated February 27, 1877; application filed December 19, 1876.

*To all whom it may concern:*

Be it known that I, WILLIAM WHIPPLE, of Carbon, Adams county, Iowa, have invented Improvements in Wheel Harrows or Cultivators, of which the following is a specification:

My invention relates to improvements in cultivators or harrows, whereby the earth, sods, stalks, &c., are thoroughly broken and divided, and prevented from clogging the teeth.

In the accompanying drawing, Figure 1 is a sectional elevation of a harrow with my improvements; Fig. 2, a rear view, partly in section; and Fig. 3, a detached perspective view.

The frame of the machine is supported by one or more side wheels, A A, and a pilot-wheel, B, may be used, the permanent portion C of the frame carrying the axles of the wheels, and being provided with guides $a\ a$, on which slides vertically the adjustable and detachable portion D of the frame.

The portion D is, in the present instance, a rectangular frame, which is suspended by cords or chains $b$ from a drum, E, turning in bearings on the frame C, and operated by a lever, F, and cord $c$, arranged conveniently to the driver's seat G.

The frame D carries harrow or cultivator teeth H, which are split or divided except at or near the lower ends, the sides of the divided shanks being attached to longitudinal bars $e$, extending between parallel cross-beams $f\ f$ of the frame D.

Directly above each row of teeth turns a shaft, $g$, carrying a series of cutters, which may consist of radial blades, but are preferably toothed wheels or disks I, the cutters extending between the bars $e\ e$ into the slots in the teeth, as shown.

From the shafts, midway between the cutters, extend bars N, Fig. 2, for a purpose described hereafter.

A pinion, $m$, on the end of each shaft $g$, gears with a pinion, $s$, carried by an arm, J, hung to the axle, driven by a toothed wheel, $p$, carried by the side wheel A.

When the machine is to be operated the lever F is drawn back, thus lowering the frame D until the teeth enter the ground. Upon moving the machine forward the earth will be opened as usual, and the clods, as well as stalks, roots, &c., will be caught upon the shanks or lower portions of the teeth, and will be pulverized, cut, and divided by the cutters I, which rotate in the direction of the arrows, while the bars N knock away the stalks and other matter as fast as cut.

It will be seen that each tooth is thus maintained free from the matters which collect upon the teeth and impair the efficiency of ordinary harrows, the stalks are thoroughly divided, while the sod is also more effectually broken. By turning the roller E the harrow or cultivator frame D may be adjusted to any desired height.

Broadcast-seeders may be attached at the forward part of the machine, or a drill-seeder may be secured on the rear part of the machine, without removing the frame D, a hollow cast-iron brace being attached behind each tooth for seed to pass downward.

As various modes of adjusting the frame D and of operating the cutters may be employed, I do not limit myself to the means described. For instance, the axles of the wheels may be adjustable, and the shafts may be in sections, turning independently, and the blades may rotate at the sides of the teeth H instead of in the slots.

I claim—

1. The combination of the teeth H, divided at the upper ends and carried by cross-bars $e\ e$, or their equivalents, and cutters I, attached to shafts $g$, arranged above the teeth, to carry the cutters through the slots of the teeth or at the sides, substantially as set forth.

2. The combination of the teeth H and shafts carrying cutters I and bars N, substantially as specified.

3. The combination of the frame D, cross-bars $e\ e$, and teeth divided at the upper ends, each side being connected to one of the said bars, respectively, as set forth.

In testimony whereof I have signed my name to this specification in the presence of two subscribing witnesses.

WM. WHIPPLE.

Witnesses:
A. B. COOK,
THEO. O. MUNDSON.